June 12, 1956 J. F. MEISSNER 2,750,023
BED BLENDING SYSTEM
Filed May 7, 1952 6 Sheets-Sheet 1

INVENTOR.
John F. Meissner
BY
Brown, Jackson, Boettcher + Dienner,
Attys.

June 12, 1956

J. F. MEISSNER

2,750,023

BED BLENDING SYSTEM

Filed May 7, 1952

INVENTOR.
John F. Meissner
BY
Brown, Jackson, Boettcher & Dienner,
Attys.

United States Patent Office 2,750,023
Patented June 12, 1956

2,750,023
BED BLENDING SYSTEM
John F. Meissner, La Grange, Ill.

Application May 7, 1952, Serial No. 286,641

18 Claims. (Cl. 198—36)

This invention relates to blending of minerals and other crushed or comminuted materials which may vary in chemical composition, to produce a composite mass of the blended material which is of substantially uniform chemical composition suitable for use in industrial operations.

Blending of materials for use in industrial operations has been known for many years. In the Robins-Messiter system, which probably is the earliest bed blending system and was first used approximately forty years ago for blending direct smelting copper ores, the material, copper ore, is deposited in beds having many hundreds of layers of ore, from which the ore is removed by a reclaimer which advances lengthwise of the bed and removes a complete cross section thereof as it advances, thus effectively intermixing the numerous layers of the bed so as to produce a blend of the ore which is uniform chemically, or so nearly uniform that such slight differences as may exist in the resultant blend in no way interferes with treatment thereof as a product or blend having uniform chemical characteristics. In the Robins-Messiter system each bed had an overhead distributing conveyor and tripper and a tunnel reclaiming conveyor extending along one side of the bed. The reclaimer had a harrow for reclaiming the material throughout the full cross section of the bed, and a flight conveyor operable in one direction only for moving the blended material to one side of the bed to the tunnel reclaiming conveyor. The reclaimer was transferred from bed to bed, as required. While that system was efficient in respect to blending of the material, the necessity of providing the beds with individual distributing conveyors and tunnel reclaiming conveyors was quite substantial and that system, in its original form, has not been extensively used for that reason. With a view to eliminating the cost of the overhead distributing conveyors of the Robins-Messiter system, a movable gantry type conveyor bridge was adopted, this bridge being spotted over the bed area to be filled with layered material and served by a trunk line conveyor. That eliminated in substantial portion the costly individual overhead distributing conveyors but the length and capacity of the beds were limited to the feasible span of the gantry conveyor bridge, so that the capacity of the beds produced was inadequate for present day practice in which the beds may contain from approximately 25,000 to 40,000 tons of material and have a length of from approximately 500 feet to 700 feet. Further, in the systems using the gantry type conveyor bridge and the reclaimer having a gathering flight conveyor discharging to one side only of the reclaimer, it was still necessary to provide a tunnel reclaimer conveyor for each bed, the provision of which incurred heavy expense such that systems using the gantry type conveyor bridge did not come into extensive use, due to the expense involved. In a later bed blending system, the material to be blended is deposited in layered beds by a high tripper with boom conveyors at each side, usually called a stacker, this high tripper or stacker receiving the material from an associated distributing conveyor and serving two bed areas. In this system the reclaimer is provided with a reversible flight gathering conveyor for moving the blended material to either side of the bed being reclaimed and delivering it to a tunnel reclaiming conveyor extending alongside the bed. The tunnel reclaiming conveyor serves two beds and the distributing conveyors and the tunnel reclaiming conveyors alternate. The system just referred to is disclosed in the Andrada Patent No. 2,171,528 and is a distinct advance over the previous systems in that the number of tunnel reclaiming conveyors required for a given system is reduced by one-half, thus effecting a substantial saving in expense since, as noted, the tunnel reclaiming conveyors are quite expensive both in installation and maintenance.

My invention is directed to a bed blending system which avoids the objections to the present systems, above referred to, and which effects a substantial saving in cost, both in installation and maintenance, compared to the known systems. In the system of my invention I provide conveyors which serve both as distributing conveyors and as reclaiming conveyors, thus eliminating the tunnel reclaiming conveyors of the presently known systems above referred to thereby effecting a substantial saving in cost of installation and maintenance of such a system. I also provide, in the system of my invention, a reclaiming unit of novel construction and operation having means whereby the reclaimed blended material may be delivered to a distributing-reclaiming conveyor at either side of the bed of layered material being reclaimed. Accordingly, it is necessary to provide but one distributing-reclaiming conveyor for each two beds in the system while also, as noted, eliminating the use of separate reclaiming conveyors such as the tunnel reclaiming conveyors of the presently known systems, thereby effecting a substantial saving in cost in respect to installation and maintenance of conveyors. Further, the system of my invention is particularly advantageous, in certain respects, for disposing the layered beds of material between retaining walls or within roofed enclosures or sheds so that sufficiently large volumes of materials may be stored in enclosures to justify the cost thereof. That is of particular importance in respect to iron ore and coal for coking, since many of the steel plants are located in this country, in the temperate zone where freezing of the beds of material, if exposed to the atmosphere, would be apt to occur in cold weather, with resultant difficulty in reclaiming the bedded material. Further objects and advantages of my invention will appear from the detail description.

Figure 1:
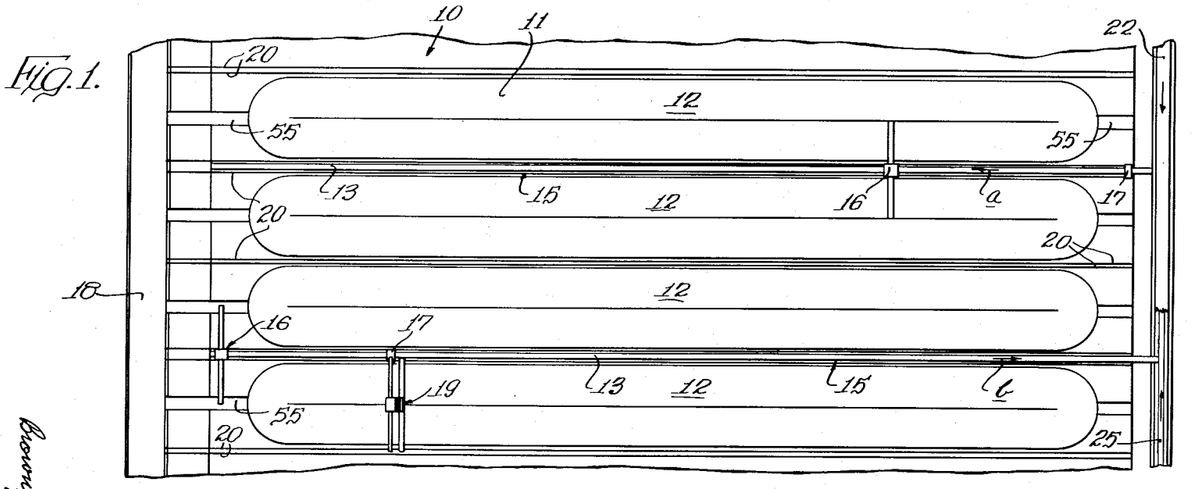
Figure 1 is a diagrammatic plan view of a bed blending system embodying my invention, showing four beds of material, the bedding floor being shown fragmentarily.
Figure 2:
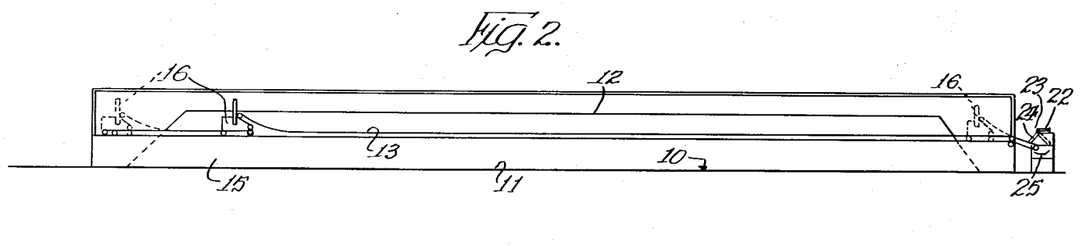
Figure 2 is a diagrammatic side view of the bed blending system shown in Figure 1.
Figure 3:
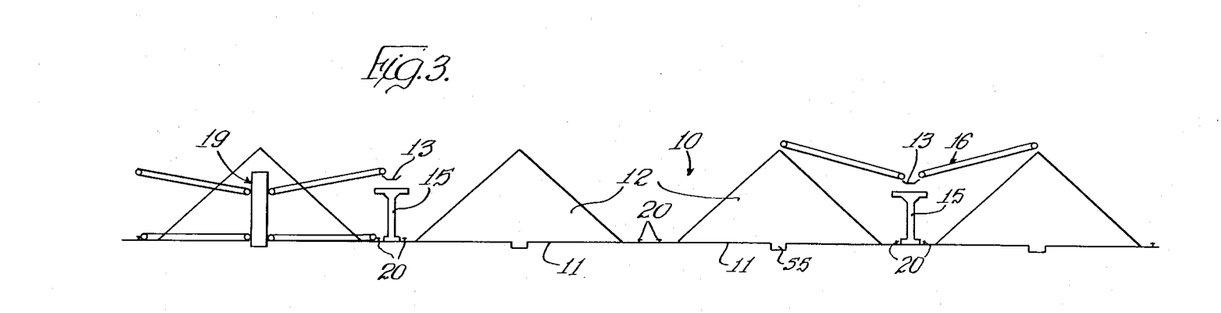
Figure 3 is a diagrammatic end view, partly in section, of the bed blending system shown in Figures 1 and 2.

In Figures 1 to 3, inclusive, I have shown fragmentarily a bedding floor 10 providing adjacent parallel bed areas 11. The bed areas 11 are respectively of generally oblong shape and of predetermined length and breadth to receive layered piles or beds of ore or other materials deposited thereon, and the floor 10 is likewise of predetermined length and breadth depending upon the number of bed areas required. Four beds 12 of layered material are shown on the adjacent bed areas 11, it being understood that additional layered beds are provided on the floor 10. Two distributing and reclaiming conveyors 13 extend between adjacent beds 12, these conveyors being spaced apart two bed areas 11. As will be understood, from what has been said, the beds 12 are disposed in pairs, there being a conveyor 13 between each two adjacent pairs of bed areas 11 and beds 12 thereon.

The conveyors 13 are mounted on the top of pedestal wall structures 15 of substantial height, approximately 9 feet, as will appear more fully later. A tripper-stacker unit 16, to be described more fully later, is associated with each of the conveyors 13 and travels along the top of the pedestal wall structure 15. A hopper 17 is also associated with each of the conveyors 13 and is movable along the top of the pedestal wall structure 15 in overlying relation to the upper run of the conveyor 13 for delivering blended and reclaimed material thereto. The conveyors 13 are reversible and are driven by suitable known means. A transfer track 18 extends across one end of the bedding floor 10 and recives a transfer car (not shown) travelling thereon in either direction desired. A reclaiming unit 19, to be described more fully later, travels lengthwise of the respective beds 12, on rails 20 disposed at opposite sides of the bed. This reclaiming unit 19 may be disposed for reclaiming blended material from any of the beds selectively, by means of the transfer car and the transfer track 18 as will be understood. A main feed conveyor 22 extends across the other end of the bedding floor 10 and has associated therewith a tripper 23 movable lengthwise of the upper run of conveyor 22 and provided with a hinged chute 24 disposed to overlie the adjacent ends of the upper runs of the distributing and reclaiming conveyors 13. As will be understood from what has been said, material to be blended may be delivered by the feed conveyor 22 to any one of the distributing and reclaiming conveyors 13, selectively. When material to be blended is thus delivered to one of the distributing and reclaiming conveyors 13, that conveyor is so driven that the upper run thereof travels towards the left, as viewed in Figure 1, as indicated by the arrow *a*. The associated tripper-stacker unit 16 receives the material to be blended from the upper run of the conveyor 13 and travels back and forth along the top of the pedestal wall structure 15 so as to distribute the material in layered bed form on either one or both of the adjacent bed areas 11, to produce the layered bed or beds 12, as will be explained more fully later. In this layering operation the hopper 17 of the distributing and reclaiming conveyor receiving material to be blended is disposed at the extreme right end of that conveyor, as viewed in Figure 1, beyond the path of travel of the stacker 16 during the layering operation. A take-off conveyor 25 extends across the end of the bedding floor 10 in underlying relation to the feed conveyor 22. The upper run of this take-off conveyor 25 is disposed in underlying relation to the adjacent ends of the distributing and reclaiming conveyors 13 for receiving blended and reclaimed material discharged therefrom. In the reclaiming operation the tripper-stacker unit 16 is disposed at the left end of the pedestal wall structure 15, as viewed in Figures 1 and 2, and the reclaiming unit 19 travels lengthwise of the layered bed of material to be reclaimed, toward the right end thereof and, during its travel, blends the material and delivers the reclaimed blended material to the hopper 17, which travels with the reclaiming unit 19 along the pedestal wall structure 15. The blended and reclaimed material is delivered by the hopper 17 onto the upper run of the corresponding distributing and reclaiming conveyor 13, which is then so driven that the upper run thereof travels toward the right, as viewed in Figure 1 and as indicated by the arrow *b*. The blended material thus reclaimed is delivered by the conveyor 13 to the take-off conveyor 25 which may delived the reclaimed material to the furnaces or to any other suitable point of delivery.

Figure 4:
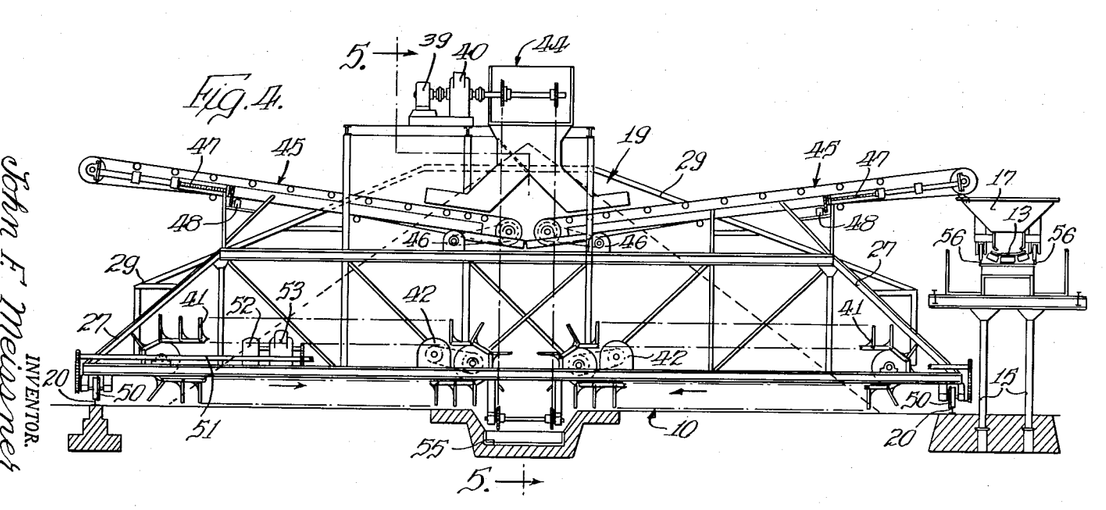
Figure 4 is a rearward elevational view of the reclaimer of the system of my invention.
Figure 5:
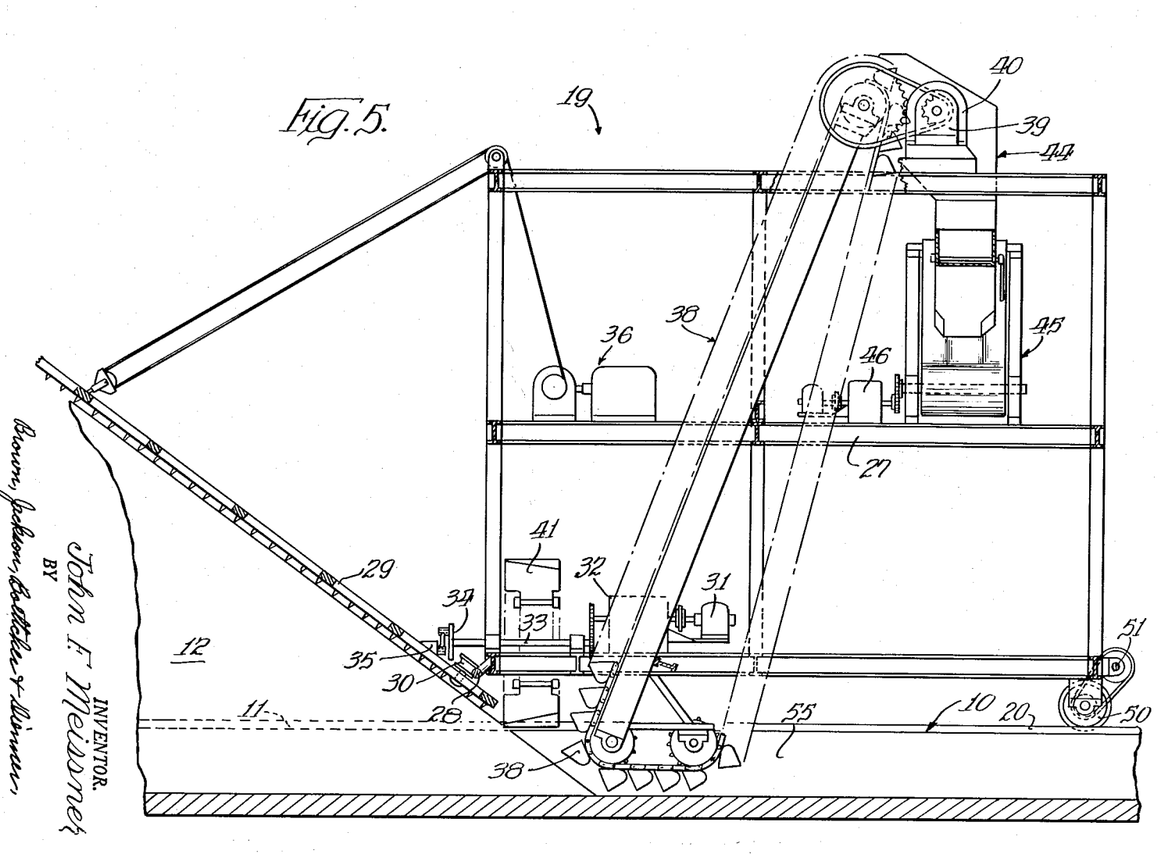
Figure 5 is a sectional view taken substantially on line 5—5 of Figure 4, certain parts being shown in elevation.

The reclaiming unit is shown more clearly in Figures 4 and 5. It comprises a suitably constructed frame 27 at the front of which is suitably mounted a lengthwise cylindrical rail 28. A harrow 29 is tiltably mounted on the rail 28 for movement thereabout and movement lengthwise thereof, by grooved rollers 30 mounted on harrow 29 adjacent the base thereof and seating on rail 28. The lower portion of harrow 29 is of approximately rectangular shape and the upper portion thereof is of approximately triangular shape, the length of the lower portion of the harrow being approximately that of frame 27 and somewhat greater than the width of a layered bed of material 12 to be blended and reclaimed, it being noted that the respective beds 12 are of inverted V-shape in cross section. The harrow 29 is reciprocated lengthwise of rail 28 by suitable known means comprising an electric motor 31, a speed reducer 32 and a shaft 33 driven thereby and having a disc 34 fixed on its forward end. The disc 34 has secured thereto an eccentric pin connected by a rod to a pin of an adjustable bracket 35 on the harrow 29. As will be understood, when the disc 34 is rotated the harrow 29 is reciprocated to limited extent determined by the throw of the eccentric or crank pin of the disc 34. Any other suitable known means may be provided for reciprocating the harrow 29. An electric hoist 36 is attached to the harrow 29 for adjusting the inclination thereof by tilting it about the rail 28.

A bucket elevator 38 is mounted at the mid-length of frame 27, centrally of the harrow 29, and is driven by an electric motor 39, through a speed reducer 40. The bucket elevator 38 extends downwardly below frame 27 and is provided with a lower horizontal run extending below the upper face of bed 10, as will be explained more fully presently. Two flight gathering or drag conveyors 41 are mounted on the frame 27 at opposite sides of the elevator 38 with their lower runs disposed beneath the frame so that the lower edges of the flights are in close proximity to the face of bed 10. Each of the gathering conveyors 41 is driven by a motor and speed reducer unit 42 having chain and sprocket driving connection thereto. The drive of the respective conveyors 41 is such that the lower runs thereof travel toward the elevator 38, as indicated by the arrows in Figure 4.

The elevator 38 discharges into an automatic two-way chute 44 of known construction and operation the disdischarge legs of which overlie transfer conveyors 45 mounted on the upper portion of frame 27 and projecting beyond opposite sides thereof. Each of the transfer conveyors 45 is driven by an electric motor-reducer unit 46 through a chain and sprocket drive. The conveyors 45 are retractable, the outer portions thereof being telescopic and adjusted by means of threaded rods 47 rotated in desired direction and to desired extent by electric motors 48 having chain and sprocket driving connection thereto. The effective length of the respective conveyors 45 may thus readily be varied, for a purpose which will be explained more fully later.

The frame 27 of the reclaiming unit 19, or reclaimer, as it is frequently termed, is mounted on wheels 50 which travel on the rails 20. Suitable known means is provided for driving the reclaimer at relatively low speed during the reclaiming operation and at relatively high speed when moving it from one location to another. A brief description of such drive means will suffice. It comprises a line shaft 51 adjacent the back of frame 27 and extending lengthwise thereof, the ends of shaft 51 having chain and sprocket driving connection to the rear wheels 50 of the reclaimer. The shaft 51 is driven at appropriate speed by means of a motor 52 and a speed reducer 53 having chain and sprocket driving connection to shaft 51. The motor 52 may be used for driving the reclaimer at relatively high speed and may be reversible for driving it in either direction. Additionally, a second motor and speed reducer (not shown), having driving connection to the line shaft 51 may be provided for driving the reclaimer forward at relatively low speed, suitable clutches and controls being provided for throwing either motor into and out of operation as desired and as is well known.

Each bed area 11 of the floor 10 is provided with a central lengthwise shallow trench 55. This trench 55 receives the short horizontal lower run of the elevator 38, as shown in Figures 4 and 5. Referring more particularly to Figure 5, it will be noted that the lower end of the front run of elevator 38 is disposed a short distance in rear of and between the gathering conveyors 41. In the reclaiming operation, the reclaimer is advanced at low speed lengthwise of the layered bed of material being reclaimed. The reciprocating harrow 29 causes displacement of a complete cross section of the bed during each reciprocation thereof and the material thus displaced flows downward to the base of the bed and is then moved inward by the gathering conveyors 41 into the trench 55. The buckets at the lower horizontal run of the elevator 38 remove the blended material from the trench 55 and discharge it into the chute 44. One of the transfer conveyors 45 is extended so that its outer end overlies the hopper 17 travelling on rails 56 on top of the pedestal wall structure 15 and overlying the upper run of the distributing and reclaiming conveyor 13, as shown in Figures 1 and 4. The chute 44 directs the reclaimed material onto the conveyor 45 overlying the hopper 17, which travels with the conveyor 45 during the reclaiming operation, so that the reclaimed material is delivered by the hopper to the conveyor 13 and is discharged from the latter onto the take-off conveyor 25, as previously described. After the selected bed of material has been reclaimed, the outer end portions of the transfer conveyors 45 are retracted so as to clear the pedestal wall structure 15 and associated parts, and the reclaimer may then be driven at comparatively high speed so as to be returned to the transfer car and track to be transferred to another bed to be reclaimed. It will be clear, from what has been said, that the reclaimer is used both for reclaiming the blended material and for delivering it to the distributing and reclaiming conveyors, thus avoiding any necessity for providing separate tunnel reclaiming conveyors, with a substantial saving in cost of the system. Further, as will be clear from what has been said, the height of the pedestal wall structure 15 is such that the corresponding transfer conveyor 45 of the reclaimer 19 will be disposed in cooperating overlying relation to the hopper 17 during the reclaiming operation.

Figure 6:
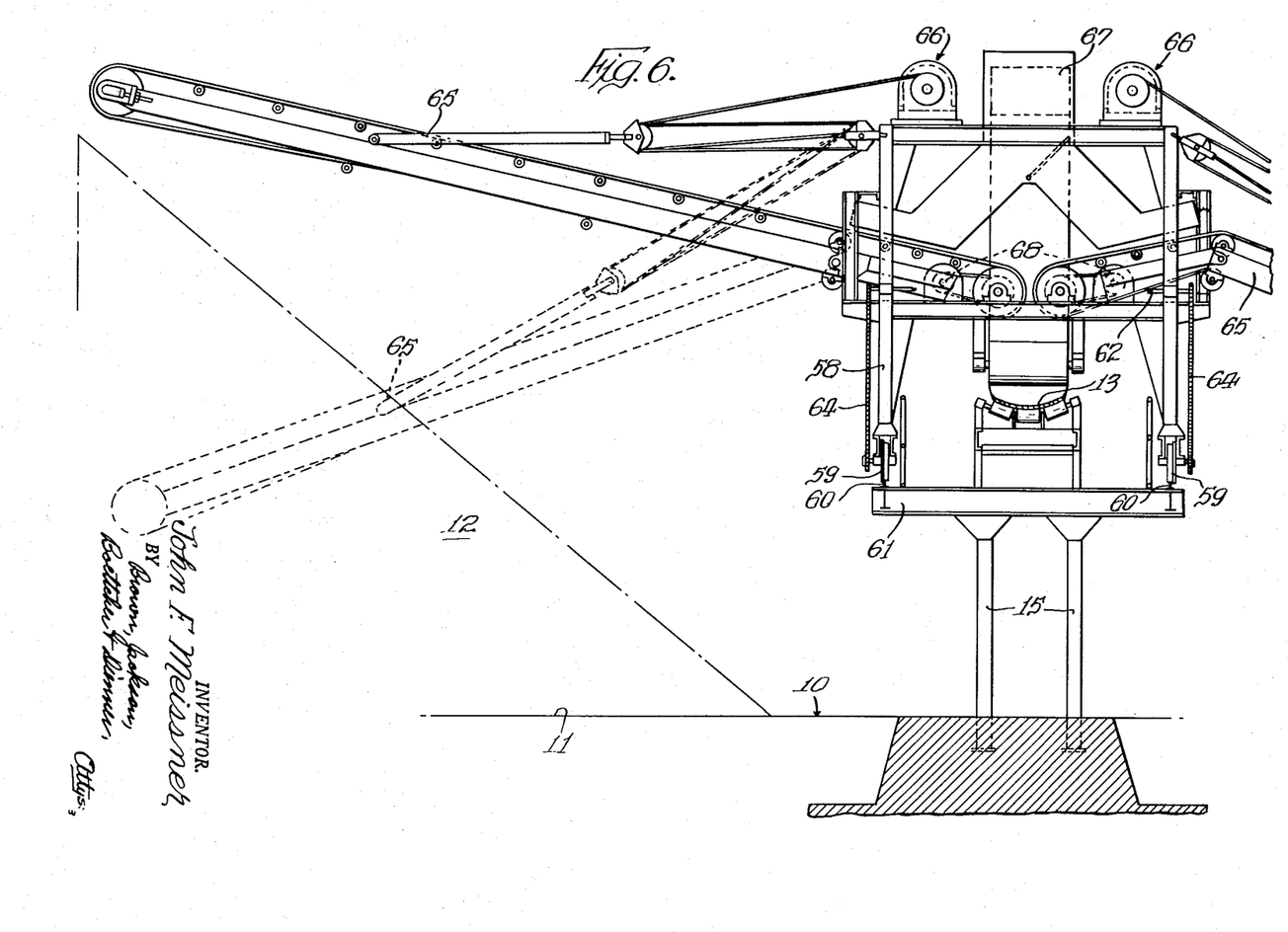
Figure 6 is a rearward elevational view of the tripper-stacker unit of the system of my invention mounted on the pedestal wall structure, certain parts being shown in section.
Figure 7:
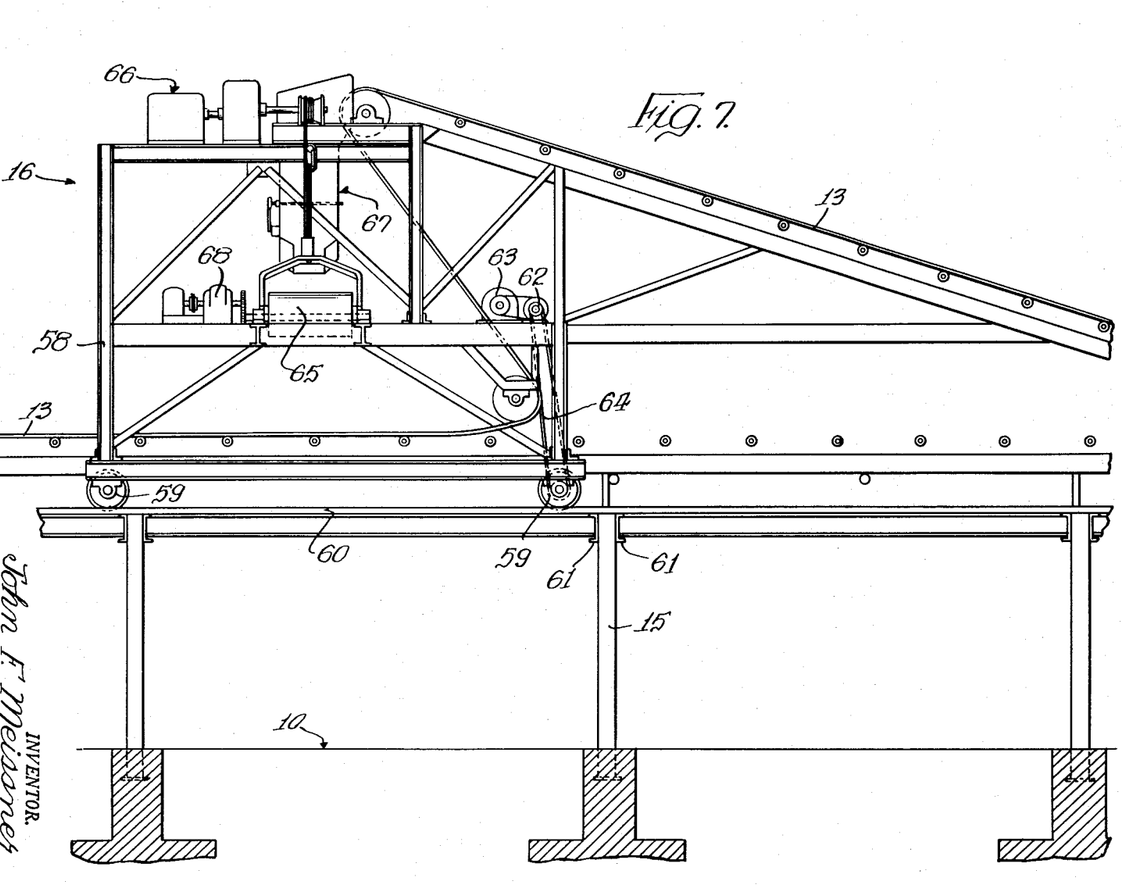
Figure 7 is a side view of the tripper-stacker unit and associated parts of Figure 6.

The tripper and stacker unit 16, frequently referred to as a stacker, is shown more clearly in Figures 6 and 7. It is of known construction and operation and a brief description thereof will suffice. The stacker 16 comprises a suitable frame 58 mounted on wheels 59 travelling on rails 60 carried by cross beams 61 of the pedestal wall structure 15 a short distance below the top thereof. A line shaft 62 is mounted on frame 58 and is driven by an electric motor and speed reducer unit 63 having chain and sprocket driving connection to shaft 62. The ends of the shaft 62 have chain and sprocket driving connections 64 to the front wheels of the unit 16, and the motor of unit 63 is reversible and has associated therewith a suitable control, for driving the stacker 16 in desired direction and at desired speed. Two boom conveyors 65 are pivoted on the frame 58 at opposite sides thereof and are adjustable by electric hoists 66 in a known manner. The conveyors 65 are of proper length to deliver material discharged therefrom along the adjacent bed areas 11 at opposite sides of the pedestal wall structure 15. The unit or stacker 16 also includes an automatic tripper 67 which receives material to be blended from the distributing and reclaiming conveyor 13. The legs of the tripper 67 overlie the inner end portions of the boom conveyors 65 for delivering material to either of the conveyors 65, selectively, or to both thereof simultaneously. At the start of the layering operation, the boom conveyor 45 may be inclined downward and outward so that its outer discharge end is spaced a short distance above the bed area 11, to reduce dusting. As the height of the bed being layered increases the conveyor 45 is raised, as will be understood, the stacker 16 travelling back and forth along the pedestal wall structure 15 for the length of the bed being formed, during the layering operation. Each of the boom conveyors 65 is driven by a motor and reducer unit 68 mounted on frame 58 and having chain and sprocket driving connection to the inner end of the conveyor, as is known.

It will be understood, from what has been said, that in the bed blending system of my invention the reclaimer of my invention cooperates with the distributing and reclaiming conveyors 13 and with the stackers 16 and the hoppers 17 in such manner that the conveyors 13 may be utilized both as distributing conveyors and as reclaiming conveyors. In that manner I eliminate the separate tunnel reclaiming conveyors presently used and reduce by one-half the total number of conveyors required for a given bed blending system, thus effecting a quite substantial saving in expense in respect to both original installation and maintenance. Such substantial saving in cost is sufficient to justify extensive use of the bed blending system of my invention for blending iron ore, coal to be coked for use in metallurgical operations, and many other materials.

While I preferably dispose the feed conveyor 22 and the take-off conveyor 25 at one end of the bed 10, that is not essential and, within the broader aspects of my invention, one of those conveyors may be disposed at one end of the bed and the other thereof at the other end of the bed. For example, the feed conveyor 22 may be disposed at the left end of the bed 10, as viewed in Figures 1 and 2, the take-off conveyor 25 remaining at the right end. In such case the feed conveyor 22 should be raised sufficiently to clear the reclaimer when the latter is transferred from one bed to another, the corresponding end portions of the distributing and reclaiming conveyors 13 being inclined upwardly, or other suitable provision made for delivering the material from the conveyor 22 to the conveyors 13, as will be understood. With the feed conveyor 22 at the left end of the bed 10 the distributing and reclaiming conveyors 13 may be driven so that the upper runs thereof travel in the direction of the arrow b during distributing and reclaiming, and reversal of those conveyors is not necessary.

Figure 8:
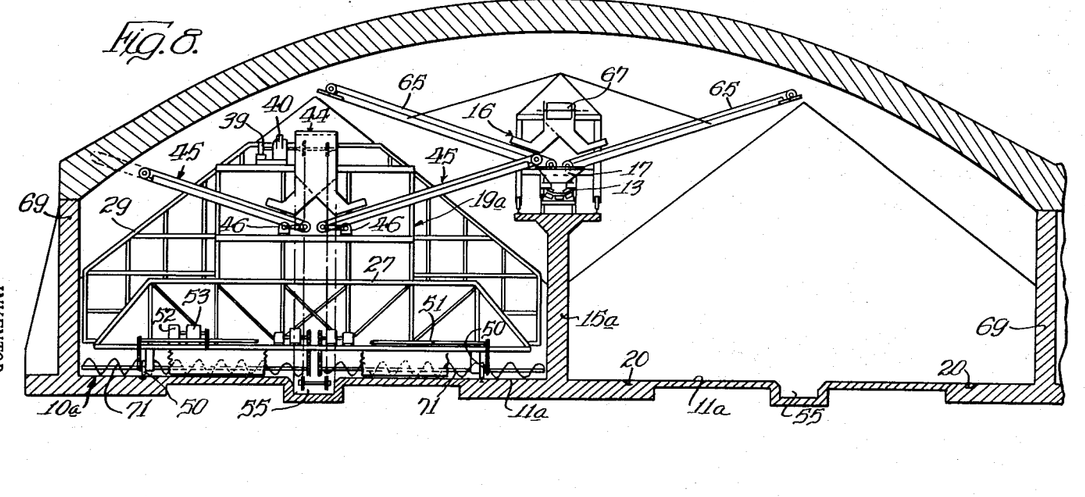
Figure 8 is an end view of an enclosed unit of a bed blending system embodying a modified form of my invention.

I have described the system of my invention above as used for open bed blending. It is often desirable, particularly in a temperate zone where freezing weather may be encountered, to blend materials in enclosed beds to guard against freezing thereof. In Figure 8 I have shown a modified form of the system of my invention well suited for enclosed bed blending. The bedding floor 10a is shown as separated into two bed areas 11a by a central pedestal wall structure 15a which is closed throughout its length, as distinguished from the openwork pedestal wall structure 15, and two side retaining walls 69. A roof structure 70 spans the space between the side retaining walls 69 and provides therewith a shed or enclosure for the bed areas 11a. The stacker 16 travels along the top of the central pedestal wall structure 15a, as before, as does the hopper 17. The reclaimer 19a is substantially the same as the reclaimer 19 and the same reference numbers may be used for the same parts in each. In the reclaimer 19a the gathering conveyors for moving the blended and reclaimed material to the trough or trench 55 are in the form of screw conveyors 71, instead of flight conveyors, in order that they may gather the material from the faces of the walls 69 and 15a and for the full width of the bed area 11a.

Otherwise, the operation of the reclaimer is the same as that previously described and need not be repeated here, it being noted that the outer end of the transfer conveyor 45 of the reclaimer, not being used, is in retracted position to clear the roof structure 70. In Figure 8 it is assumed that the layered bed of material at the left is being reclaimed and that the stacker 16 has completed a layered bed on the bed area. After the bed at the left has been completely reclaimed, the reclaimer may be utilized for reclaiming a layered bed of some other two-bed unit of the system while the stacker 16 is depositing a layered bed on the area of the bed which has just been reclaimed. The roof structure 70 and the side retaining walls 69 provide an enclosure or shed which protects the beds of material against moisture and freezing. It is contemplated that the walls of the structure will be provided with heating ducts for maintaining the temperature within the enclosure above freezing. In that connection, it will be understood that suitable doors will be provided for closing the ends of the enclosing structure. Aside from protecting the beds of material, the retaining walls 69 and the pedestal wall structure 15a render it possible to build up the sides of the beds to substantial depth thereby substantially increasing the capacity of the available floor bed area, which frequently is an important consideration. Accordingly, within the broader aspects of my invention, the roof structure 70 may be omitted, particularly in areas where freezing is not likely to occur, the walls 69 and the pedestal wall structure 15a then functioning to provide substantially increased capacity of the available bed area.

Figure 9:
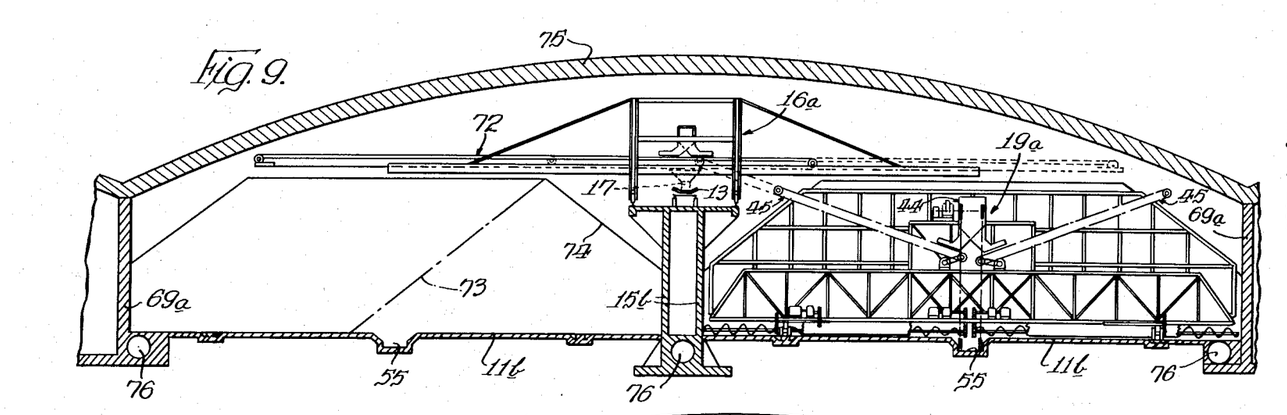
Figure 9 is a view similar to Figure 8 but showing a second modified form of reclaiming unit embodying my invention.

Coal has an average weight of 50 pounds per cubic foot, as compared to from 125 pounds to 160 pounds for iron ore. It is highly desirable that coal to be coked for metallurgical operations be thoroughly blended. In order to obtain thorough blending it is necessary to bed the material in hundreds of thin layers. In order to obtain that result in coal, the height and width of the bed would exceed practical limits of the span of the reclaimer and its gathering conveyors, if done in open beds containing the amount of coal required under present day conditions, which may be as much as from 30 to 40 thousand tons of coal per bed. I have found that the required amounts of coal can be blended in a single bed between retaining walls giving the required bed capacity for a given bed floor area, by the use of a special stacker, as will be explained with reference to Figure 9. The unit shown in Figure 9 provides two bed areas 11b between outer retaining walls 69a and the central pedestal wall structure 15b, which is closed throughout its length. The stacker 16a is similar to the stacker 16 except that the two boom conveyors of the latter stacker are replaced by a single reversible shuttle conveyor of known construction and operation adjustable transversely of the stacker 16a so as to extend to any desired extent, within limits, beyond either side thereof. It may be assumed that the stacker is just completing a layered bed of material, such as coal, on the left bed area 11b, having previously completed a layered bed on the right bed area 11b. In laying down the bed on the left area 11b, the conveyor 72 is first moved to its position indicated in dotted lines and remains in that position until the portion of the bed between the dot-and-dash line 73 and the inclined surface 74 has been completed, this portion being of substantially inverted V-shape in cross section. When this initial portion of the bed has been brought to its full height, the layering continues along the left slope of the bed being formed until completion thereof. The material deposited at the top of that slope by the conveyor 72 flows by gravity downward therealong so that the material is laid down in a great number of thin layers. As will be understood, the conveyor 72 is gradually moved toward the left as the width of the bed being formed increases in that direction. The bed thus produced is of substantially elongated rectangular or oblong shape in transverse section, at its lower portion, and of substantially frusto-conical shape at its upper portion, as shown. The capacity of this bed per linear foot is much greater than that of a bed of equal width not formed between retaining walls.

Upon completion of the bed on the left bed area 11b of Figure 9, the layered bed on the right area 11b may be reclaimed. During the reclaiming operation, the reclaimer takes a complete cross section of the bed during its advancement therealong and removes an equal amount of material from each layer thereof at all times, in the same manner as above described, thereby assuring complete and thorough blending of the material. The material thus blended and reclaimed is delivered to the adjacent distributing and reclaiming conveyor 13 on the pedestal wall structure 15b, conveyor 13 now serving as a reclaiming conveyor in the manner previously described. After the bed of material has been completely reclaimed, the reclaimer may be shifted to another bed of the system and a new layered bed may be laid on the floor area 11b at the right of Figure 9 by the stacker 16a, in the same manner as the bed was laid on the left floor bed area 11b. Obviously, if desired, both of the beds in a unit such as that shown in Figure 9 may be reclaimed and the reclaimer may be transferred to some other unit and there used for reclaiming the beds of that unit while new beds are being laid in the first unit. While the unit of Figure 9 is particularly suitable for layer bedding coal, it may also be used for bedding ore, such as iron ore, and other materials, and is advantageous as providing large storage capacity which materially increases the capacity of the available bedding floor area as compared to bedding without the use of retaining walls.

Referring further to Figure 9, in cases where the bedding and blending operations are to be performed in areas where freezing temperatures are apt to be encountered, each unit is provided with a roof structure 75 joining the side retaining walls 69a and providing therewith a shed or enclosure for protecting the material from the weather. The ends of this enclosure or shed are closed and are provided with suitable doors to accommodate the reclaimer, similarly to the unit of Figure 8. Further, the walls 69a and 15b may be provided with heating ducts 76 to guard against freezing of the bedded material, as previously noted in respect to the unit of Figure 8.

As above indicated, changes in detail may be resorted to without departing from the field and scope of my invention, and I intend to include all such variations, as fall within the scope of the appended claims, in this application in which the preferred forms only of my invention have been disclosed.

I claim:

1. In a system for blending comminuted materials on a bedding floor of predetermined length and breadth providing oblong bed areas of predetermined length and breadth arranged in pairs for reception of individual layered beds of material, a reversible distributing and reclaiming conveyor between and spaced a material distance above each two adjacent pairs of bed areas, said conveyors being spaced apart the width of two bed areas, a tripper-stacker unit cooperating with the respective conveyors for layering unblended material in beds on the two bed areas adjacent said conveyor, and means for reclaiming material from either of said layered beds on said two adjacent bed areas and delivering it to said distributing and reclaiming conveyor.

2. In a system for blending comminuted materials on a bedding floor of predetermined length and breadth providing oblong bed areas of predetermined length and breadth arranged in pairs for reception of individual layered beds of material, a reversible distributing and reclaiming conveyor between and spaced a material distance above each two adjacent pairs of bed areas, said conveyors being spaced apart the width of two bed areas, a tripper-stacker unit cooperating with the respective conveyors for layering unblended material in beds on the two bed areas adjacent said conveyor, and a reclaiming unit disposable to reclaim material from the layered beds thereof and having means for delivering the reclaimed blended material at either side of said reclaiming unit selectively to the distributing and reclaiming conveyor adjacent the bed from which layered material is being reclaimed.

3. In a system for blending comminuted materials on a bedding floor of predetermined length and breadth providing bed areas of predetermined length and breadth arranged in pairs for reception of individual layered beds of material, a distributing and reclaiming conveyor between each two adjacent pairs of bed areas, a tripper-stacker unit cooperating with the respective conveyors for layering unblended material in beds on the two bed areas adjacent said conveyor, and a reclaiming unit disposable to reclaim material from the layered beds thereof and having conveyors at opposite sides thereof positionable to deliver reclaimed material at either side of said reclaiming unit selectively to the distributing and reclaiming conveyor adjacent the bed of material being reclaimed and means comprising an elevator for delivering reclaimed material from the base of the bed to said reclaiming unit conveyors selectively.

4. In a system for blending comminuted materials on a bedding floor of predetermined length and breadth providing bed areas of predetermined length and breadth arranged in pairs for reception of individual layered beds of material, a distributing and reclaiming conveyor between each two adjacent pairs of bed areas, a tripper-stacker unit cooperating with the respective conveyors for layering unblended material in beds on the two bed areas adjacent said conveyor, and a reclaiming unit disposable to reclaim material from the layered beds thereof and having conveyors at opposite sides thereof positionable to deliver reclaimed material at either side of said reclaiming unit selectively to the distributing and reclaiming conveyor adjacent the bed of material being reclaimed and means comprising an elevator for delivering reclaimed material from the base of the bed to said reclaiming unit conveyors selectively, said elevator being disposed centrally of said reclaiming unit.

5. In a system for blending comminuted materials on a bedding floor of predetermined length and breadth providing bed areas of predetermined length and breadth arranged in pairs for reception of individual layered beds of material, each of said areas having a central lengthwise trench, a distributing and reclaiming conveyor between each two adjacent pairs of bed areas, a tripper-stacker unit cooperating with the respective conveyors for layering unblended material in beds on the two bed areas adjacent said conveyor, and a reclaiming unit disposable to reclaim material from the layered beds thereof and having means for delivering the reclaimed blended material at either side of said reclaiming unit selectively to the distributing and reclaiming conveyor adjacent the bed from which layered material is being reclaimed, said means comprising an elevator operating in said trench.

6. In a system for blending comminuted materials on a bedding floor of predetermined length and breadth providing bed areas of predetermined length and breadth arranged in pairs for reception of individual layered beds of material, each of said areas having a central lengthwise trench, a distributing and reclaiming conveyor between each two adjacent pairs of bed areas, a tripper-stacker unit cooperating with the respective conveyors for layering unblended material in beds on the two bed areas adjacent said conveyor, and a reclaiming unit disposable to reclaim material from the layered beds thereof and having means for delivering the reclaimed blended material at either side of said reclaiming unit selectively to the distributing and reclaiming conveyor adjacent the bed from which layered material is being reclaimed, said means comprising an elevator located centrally of said reclaiming unit and operating in said trench and gathering conveyors for moving material at the base of the bed from the sides thereof inwardly to said trench.

7. In a system for blending comminuted materials on a bedding floor of predetermined length and breadth providing bed areas of predetermined length and breadth arranged in pairs for reception of individual layered beds of material, a pedestal wall structure of substantial height between each two adjacent pairs of bed areas, a distributing and reclaiming conveyor mounted on said structure at the top thereof, a tripper-stacker unit movable along the respective pedestal wall structures and cooperating with the respective conveyors for layering unblended material on the two bed areas adjacent said conveyor, and means for reclaiming material from each of said layered beds on said two adjacent bed areas and delivering it to said distributing and reclaiming conveyor.

8. In a system for blending comminuted materials on a bedding floor of predetermined length and breadth providing bed areas of predetermined length and breadth arranged in pairs for reception of individual layered beds of material, a pedestal wall structure of substantial height between each two adjacent pairs of bed areas, a distributing and reclaiming conveyor mounted on said structure at the top thereof, a tripper-stacker unit movable along the respective pedestal wall structures and cooperating with the respective conveyors for layering unblended material on the two bed areas adjacent said conveyor, and a reclaiming unit disposable to reclaim material from the layered beds and having means for delivering the reclaimed blended material at either side of said reclaiming unit selectively to the distributing and reclaiming conveyor adjacent the bed from which layered material is being reclaimed, said means comprising distribtuing conveyors extending from the opposite sides of said reclaimer unit with their outer ends at a height to overlie said distributing and reclaiming conveyor and means for delivering to said reclaiming unit conveyors blended material from the base of the bed, said last means comprising an elevator disposed centrally of said reclaiming unit and gathering conveyors for moving material at the base of the bed from the sides thereof inwardly to said elevator.

9. In a system for blending comminuted materials on a bedding floor of predetermined length and breadth providing a pair of adjacent bed areas of predetermined length and breadth for reception of individual layered beds of material, a distributing and reclaiming conveyor between said areas, a tripper-stacker unit movable along said conveyor and cooperating therewith for layering unblended material in beds on said two bed areas selectively, a hopper overlying said conveyor movable therealong for delivering reclaimed blended material to said conveyor and positionable adjacent one end of the latter to accommodate travel of said unit for bed layering, a reclaiming unit disposable to reclaim material from the layered beds and having means for delivering the reclaimed blended material at either side of said reclaiming unit selectively to said hopper during movement thereof along said conveyor, a transverse feed conveyor for material to be blended adjacent said one end of said distributing and reclaiming conveyor, a tripper unit cooperating with said feed conveyor for delivering therefrom to said distributing and reclaiming conveyor material to be blended, and a transverse take-off conveyor adjacent one end of said distributor and reclaiming conveyor for receiving reclaimed blended material discharged therefrom.

10. In a system for blending comminuted materials on a bedding floor of predetermined length and breadth providing a pair of adjacent bed areas of predetermined length and breadth for reception of individual layered beds of material, a pedestal wall structure of substantial height between said areas, a reversible distributing and reclaiming conveyor on said structure at the top thereof, a tripper-stacker unit movable along said structure and cooperating with said conveyor for layering unblended material in beds on said two bed areas selectively, a hopper overlying said conveyor movable along said wall for delivering reclaimed blended material to said conveyor and positionable adjacent one end of the latter to accommodate travel of said unit for bed layering, a reclaiming unit disposable to reclaim material from the layered beds and having means for delivering the reclaimed blended material at either side of said reclaiming unit selectively to said hopper during travel thereof along said conveyor, an upper transverse feed conveyor for material to be blended adjacent said one end of said distributing and reclaiming conveyor, a tripper unit cooperating with said feed conveyor for delivering therefrom to said distributing and reclaiming conveyor material to be blended, and a lower transverse take-off conveyor adjacent said one end of said distributor and reclaiming conveyor for receiving reclaimed blended material discharged therefrom.

11. In a system for blending comminuted materials on a bedding floor of predetermined length and breadth providing a pair of adjacent bed areas of predetermined length and breadth for reception of individual layered beds of material, retaining walls of substantial height at the outer sides of said areas, a retaining pedestal wall structure of substantial height between said areas, a distributing and reclaiming conveyor on the top of said structure, a tripper-stacker unit movable along said structure and cooperating with said conveyor for layering unblended material in beds on said two bed areas selectively, a hopper overlying said conveyor movable along said structure for delivering reclaimed blended material to said conveyor and positionable adjacent one end of the latter to accommodate travel of said unit for bed layering, and a reclaiming unit disposable to reclaim material from the layered beds and having means for delivering the reclaimed blended material at either side of said reclaiming unit selectively to said hopper during movement thereof along said conveyor.

12. In a system for blending comminuted materials on a bedding floor of predetermined length and breadth providing a pair of adjacent bed areas of predetermined length and breadth for reception of individual layered beds of material, retaining walls of substantial height at the outer sides of said areas, a retaining pedestal wall structure of substantial height between said areas, a distributing and reclaiming conveyor on the top of said structure, a tripper-stacker unit movable along said structure and cooperating with said conveyor for layering unblended material in beds on said two bed areas selectively, said unit having a reversible layering conveyor adjustable transversely thereof to project to variable extent beyond said structure at either side thereof selectively, a hopper overlying said distributing and reclaiming conveyor movable along said structure for delivering reclaimed blended material to said distributing and reclaiming conveyor and positionable adjacent one end of the latter to accommodate travel of said unit for bed layering, and a reclaiming unit disposable to reclaim material from the layered beds and having means for delivering the reclaimed blended material at either side of said reclaiming unit selectively to said hopper during movement thereof along said conveyor.

13. In a reclaimer for reclaiming and blending comminuted materials disposed in layered beds, a mobile frame, a harrow mounted on said frame at the front thereof, transfer conveyor means extending from the sides of said frame at the upper portion thereof, and means for delivering blended material to said conveyor means comprising an elevator disposed centrally of said harrow and spaced rearwardly therefrom and means for gathering blended material from areas at opposite sides of said elevator and directing such gathered material to said elevator.

14. In a reclaimer for reclaiming and blending comminuted materials disposed in layered beds, a mobile frame, a harrow mounted on said frame at the front thereof, transfer conveyors extending from the sides of said frame at the upper portion thereof, and means for selectively delivering blended material to said conveyors comprising an elevator disposed centrally of said harrow and spaced rearwardly therefrom and means for gathering blended material from areas at opposite sides of said elevator and directing such gathered material to said elevator.

15. In a reclaimer for reclaiming and blending comminuted materials disposed in layered beds, a mobile frame, a harrow mounted on said frame at the front thereof, transfer conveyors extending from the sides of said frame at the upper portion thereof, a two-way chute overlying said conveyors for selectively delivering material thereto, an elevator disposed centrally of said harrow spaced rearwardly therefrom and discharging into said chute, said elevator extending below said frame, and gathering means extending below said frame at opposite sides of said elevator effective for moving to the latter material from the sides of the base of a layered bed of material being reclaimed by said reclaimer.

16. In a reclaimer for reclaiming and blending comminuted materials disposed in layered beds, a mobile frame, a harrow mounted on said frame at the front thereof, transfer conveyors extending from the sides of said frame at the upper portion thereof, a two-way chute overlying said conveyors for selectively delivering material thereto, an elevator disposed centrally of said harrow spaced rearwardly therefrom and discharging into said chute, said elevator extending below said frame, and gathering conveyors extending below said frame at opposite sides of said elevator between the latter and said harrow.

17. In a reclaimer for reclaiming and blending comminuted materials disposed in layered beds, a mobile frame, a harrow mounted on said frame at the front thereof, a transfer conveyor extending from the sides of said frame at the upper portion thereof and adjustable transversely of said frame, a two-way chute overlying said conveyor for delivering material thereto, an elevator disposed centrally of said harrow spaced rearwardly therefrom and discharging into said chute, said elevator extending below said frame, and gathering conveyors extending below said frame at opposite sides of said elevator between the latter and said harrow.

18. In a reclaimer for reclaiming and blending comminuted materials disposed in layered beds, a mobile frame, a harrow mounted on said frame at the front thereof, transfer conveyor means extending from the sides of said frame at the upper portion thereof operable for delivering materials at either side of said frame selectively, chute means for delivering material to said conveyor means, an elevator disposed centrally of said harrow and discharging into said chute means, said elevator extending below said frame, and gathering means extending below said frame at opposite sides of said elevator effective for moving to the latter material from the sides of the base of a layered bed of material being reclaimed by said reclaimer.

References Cited in the file of this patent

UNITED STATES PATENTS

| | | |
|---|---|---|
| 863,202 | Moss | Aug. 13, 1907 |
| 1,989,281 | Kendall | Jan. 29, 1935 |
| 2,171,528 | Andrada | Sept. 5, 1939 |
| 2,230,139 | Gustin | Jan. 28, 1941 |
| 2,554,077 | Weggum | May 22, 1951 |

FOREIGN PATENTS

| | | |
|---|---|---|
| 787,943 | France | Oct. 1, 1935 |
| 540,688 | Great Britain | Oct. 27, 1941 |